(12) United States Patent
Hsiao et al.

(10) Patent No.: US 9,341,891 B2
(45) Date of Patent: May 17, 2016

(54) SPLICING LIQUID CRYSTAL PANEL, ASSEMBLY METHOD THEREOF AND SPLICING TELEVISION INCLUDING THE PANEL

(71) Applicant: SHENZHEN CHINA STAR OPTOELECTRONICS TECHNOLOGY CO., LTD., Shenzhen, Guangdong (CN)

(72) Inventors: YuChun Hsiao, Shenzhen (CN); Yanxue Zhang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 14/240,360

(22) PCT Filed: Jan. 28, 2014

(86) PCT No.: PCT/CN2014/071708
§ 371 (c)(1),
(2) Date: Feb. 21, 2014

(87) PCT Pub. No.: WO2015/096273
PCT Pub. Date: Jul. 2, 2015

(65) Prior Publication Data
US 2015/0185558 A1    Jul. 2, 2015

(30) Foreign Application Priority Data
Dec. 27, 2013   (CN) .......................... 2013 1 0737389

(51) Int. Cl.
*H04N 5/645* (2006.01)
*G02F 1/1335* (2006.01)
*G02F 1/1333* (2006.01)

(52) U.S. Cl.
CPC ...... *G02F 1/133608* (2013.01); *G02F 1/13336* (2013.01); *G02F 1/133604* (2013.01); *H04N 5/645* (2013.01); *G02F 2001/13332* (2013.01); *G02F 2001/133314* (2013.01)

(58) Field of Classification Search
CPC .......................... G02F 1/133608; H04N 5/645
USPC ......... 348/383, 790, 798, 794, 791, 839, 840; 349/58, 61; 345/87, 108, 102
See application file for complete search history.

(56) References Cited

U.S. PATENT DOCUMENTS

| | | | | |
|---|---|---|---|---|
| 9,097,832 B2* | 8/2015 | Yu | ....................... | G02B 6/0028 |
| 2011/0102312 A1* | 5/2011 | Cho | ....................... | G02F 1/1303 345/102 |

FOREIGN PATENT DOCUMENTS

| | | | |
|---|---|---|---|
| CN | 101196621 A | 6/2008 | |
| CN | 201107508 Y | 8/2008 | |

(Continued)

OTHER PUBLICATIONS

International Search Report dated Apr. 16, 2014, issued to the corresponding International Application No. PCT/CN2014/071708.

Primary Examiner — Jefferey Harold
Assistant Examiner — Jean W Desir
(74) Attorney, Agent, or Firm — Stein IP, LLC

(57) ABSTRACT

The present disclosure relates to a splicing liquid crystal panel and a method for assembling the splicing liquid crystal panel, and a splicing television including the splicing liquid crystal panel. The splicing liquid crystal panel comprises a backlight module and a plurality of liquid crystal modules in cooperation with the backlight module. The backlight module comprises a back plate, light source lamps arranged on a first surface of the back plate, a bearing frame surrounding the edges of the back plate, and dismounting members connected between the bearing frame and a second surface of the back plate, wherein, each dismounting member comprises a first connector connected with the bearing frame and a second connector connected with the back plate, the first connector and the second connector form a hinge joint. The backlight of such a splicing liquid crystal panel has a unitary structure which is easy remove and convenient to maintain.

10 Claims, 5 Drawing Sheets

(56) References Cited

FOREIGN PATENT DOCUMENTS

| CN | 101644833 A | 2/2010 |
|---|---|---|
| CN | 101661172 A | 3/2010 |
| CN | 102057316 A | 5/2011 |
| CN | 202002026 U | 10/2011 |
| CN | 202101170 U | 1/2012 |
| CN | 102606963 A | 7/2012 |
| JP | 2003-114417 A | 4/2003 |
| JP | 2007-232937 A | 9/2007 |

* cited by examiner

SPLICING LIQUID CRYSTAL PANEL, ASSEMBLY METHOD THEREOF AND SPLICING TELEVISION INCLUDING THE PANEL

FIELD OF THE INVENTION

The present disclosure relates to a liquid crystal device, in particular to a splicing liquid crystal panel. The present disclosure further relates to a method of assembling the splicing liquid crystal panel, and a television including the splicing liquid crystal panel.

BACKGROUND OF THE INVENTION

With the development of liquid crystal technology, large size televisions obtained by splicing multiple liquid crystal televisions are used in more and more places. Generally, a large size liquid crystal television is formed by splicing a plurality of independent television modules. The modules for the splicing television are independent from each other, thus the overall manufacturing cost is relatively high. In addition, after multiple televisions are spliced into a large size television, if one of the televisions is damaged, the other undamaged ones will also need to be removed for service, such that the maintenance of the large size television is inconvenient.

SUMMARY OF THE INVENTION

To solve the above-mentioned technical problems in the prior art, the present disclosure proposes a splicing liquid crystal panel comprising a unitary backlight module. The unitary structure enables the backlight module to be easily removed, so that the maintenance of the splicing liquid crystal panel is convenient. Moreover, the present disclosure further relates to a method for assembling the splicing liquid crystal panel, and a television including the splicing liquid crystal panel.

(1) According to a first aspect of the present disclosure, a splicing liquid crystal panel comprises a backlight module and a plurality of liquid crystal modules in cooperation with the backlight module. The backlight module comprises a back plate, light source lamps arranged on a first surface of the back plate, a bearing frame surrounding the edges of the back plate, and dismounting members connected between the bearing frame and a second surface of the back plate, wherein each dismounting member comprises a first connector connected with the bearing frame and a second connector connected with the back plate, and the first connector and the second connector form a hinge joint.

According to the splicing liquid crystal panel of the present disclosure, a plurality of liquid crystal modules shares one backlight module, so that the production cost is lowered.

(2) In an embodiment of (1) according to the present disclosure, a glue frame is fixedly arranged around the edges of the bearing frame. The splicing liquid crystal panel further comprises a diaphragm supporting member connected with the glue frame. The diaphragm supporting member is arranged outside of the light source lamps and partitions the first surface into multiple cell gaps. An optical diaphragm is mounted in each of the cell gaps. On the diaphragm supporting member, liquid crystal modules are mounted outside of the optical diaphragms, and each of the multiple liquid crystal modules is aligned with the corresponding cell gap on the first surface. Therefore, through the dismounting members forming a hinge joint, the backlight module can be accessed and measured without disassembling the whole splicing liquid crystal panel. Moreover, by dismantling the dismounting members, only the back plate can be taken down instead of the liquid crystal modules, such that the maintenance of the splicing liquid crystal panel is convenient.

(3) In one of the embodiments of (1) or (2) according to the present disclosure, the light source lamps are a plurality of tubes arranged in parallel with each other. This type of light source lamps is low in cost and easy to assemble.

(4) According to a second aspect of the present disclosure, a method for assembling the above-mentioned splicing liquid crystal panel is proposed, comprising the following steps:

(a) arranging a plurality of light source lamps on the first surface of the back plate;

(b) arranging a bearing frame around the back plate;

(c) providing dismounting members, wherein a first connector of each dismounting member is connected with the bearing frame and a second connector of each dismounting member is connected with the second surface of the back plate;

(d) fixedly arranging a diaphragm supporting member outside of the light source lamps on the first surface of the back plate to partition the first surface into multiple cell gaps, and mounting optical diaphragms on the diaphragm supporting member to form a backlight module;

(e) mounting a plurality of liquid crystal modules outside of the optical diaphragms on the diaphragm supporting member to form the splicing liquid crystal panel.

(5) In one embodiment of (4) according to the present disclosure, in step (e), each of the plurality of liquid crystal modules is mounted in a corresponding cell gaps in step (f). In another embodiment, in step (e), the plurality of liquid crystal modules are first spliced together to form a unitary structure and then fit together with the backlight module.

(6) According to a third aspect of the present disclosure, a splicing television comprising the above splicing liquid crystal panel is proposed.

In the present application, the term "outside" indicates a direction opposite to the light source lamps.

Compared with the prior art, the present disclosure has the following advantages. A plurality of liquid crystal modules according to the splicing liquid crystal panel of the present disclosure shares one backlight module, so that the production cost can be lowered. And in the splicing liquid crystal panel according to the present disclosure, the backlight module is independent from the liquid crystal modules. Therefore, through the dismounting members forming a hinge joint, the backlight module can be accessed and measured without disassembling the whole splicing liquid crystal panel. Moreover, by dismantling the dismounting members, only the back plate can be taken down instead of the liquid crystal modules, such that the maintenance of the splicing liquid crystal panel is convenient.

BRIEF DESCRIPTION OF THE DRAWINGS

The present disclosure will be described in more details below based on the examples with reference to the accompanying drawings, wherein.

In the accompanying drawings, the same modules are indicated by the same reference signs. The accompanying drawings are not drawn to actual scale.

DETAILED DESCRIPTION OF THE EMBODIMENTS

The present disclosure will be further illustrated below in conjunction with the accompanying drawings.

Figure 1:
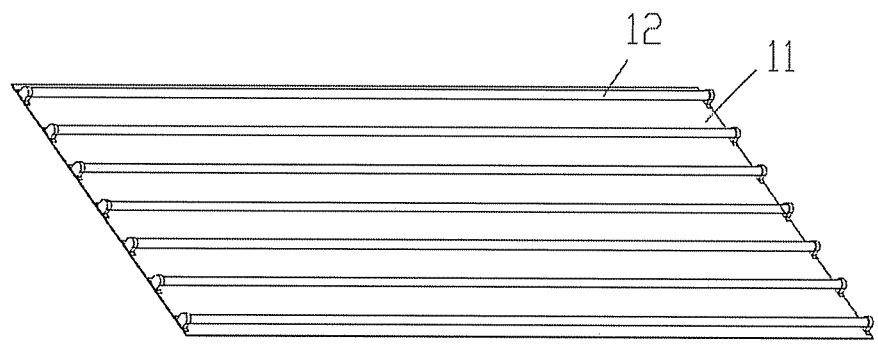
FIG. 1 is a view of a first surface of a backlight module according to the present disclosure.

As shown in FIG. 1, a backlight module 10 comprises a back plate 11. Light source lamps 12 are arranged on a first surface of the back plate 11. In an example, the light source lamps 12 can be common fluorescent lamps, cold cathode fluorescent lamps or light emitting diodes (LEDs). The connection between the light source lamps 12 and the back plate 11 is well known to those skilled in the art, and will not be described in detail herein.

Figure 2:
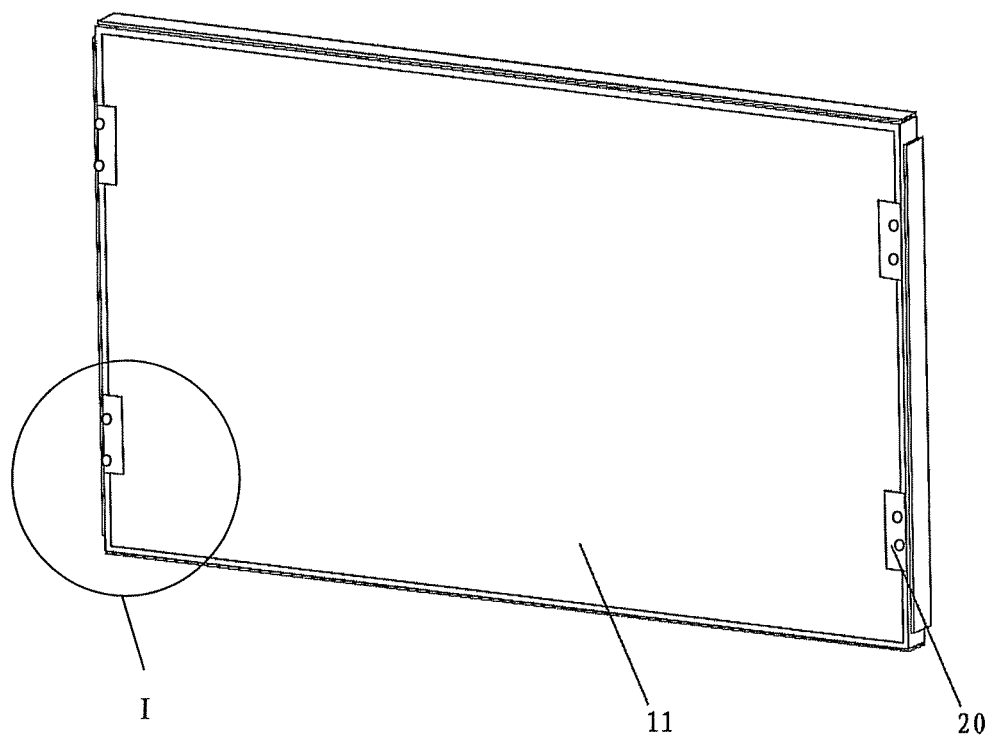
FIG. 2 is a view of a second surface of the backlight module according to the present disclosure.
Figure 3:
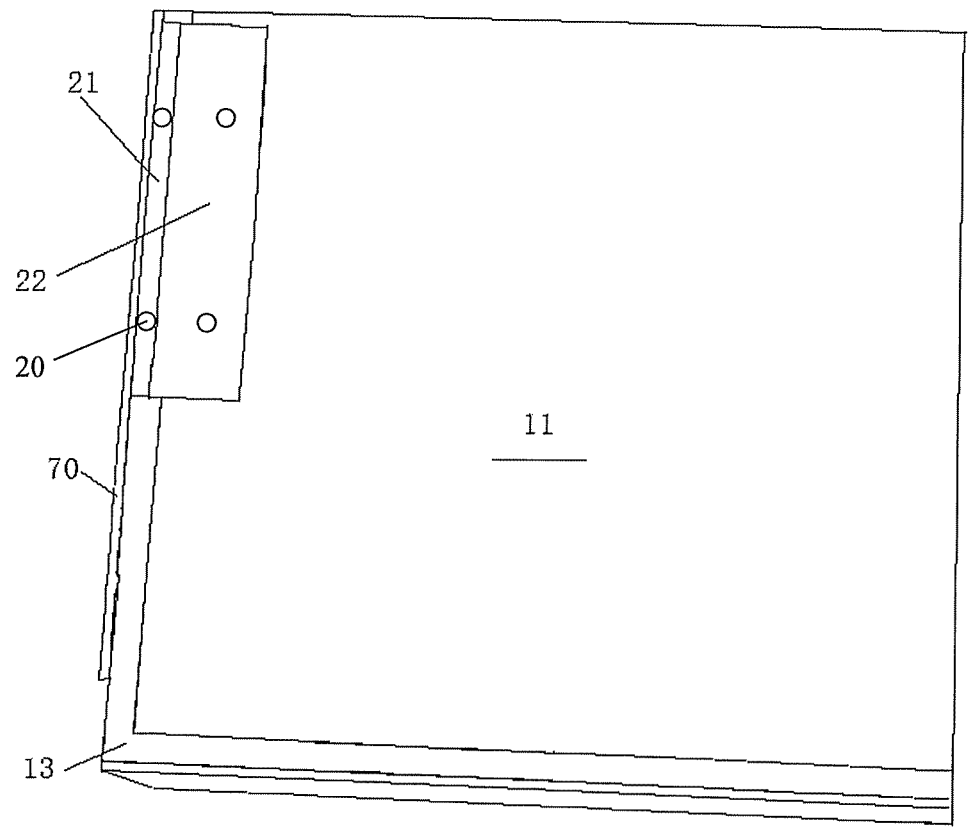
FIG. 3 is an enlarged view of portion I in FIG. 2.
Figure 4:
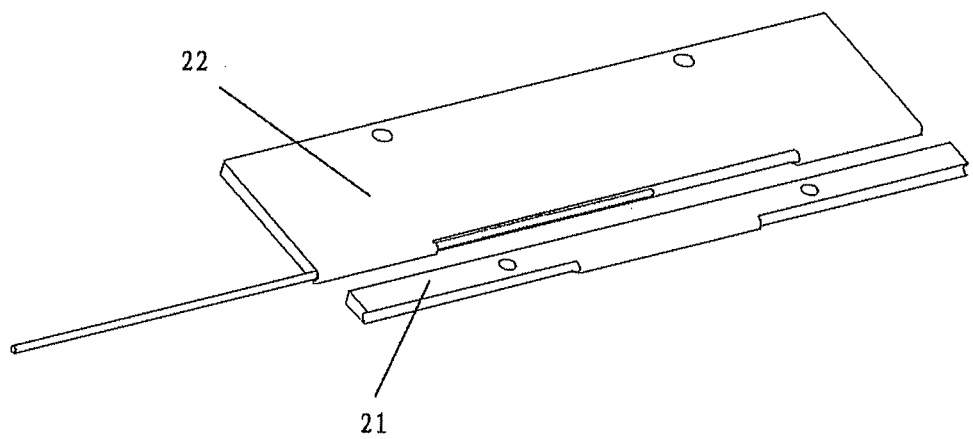
FIG. 4 schematically shows structure of a dismounting member according to the present disclosure.

As shown in FIG. 2, the backlight module 10 further comprises a bearing frame 13 surrounding the edges of the back plate 11, and dismounting members 20 connected between the bearing frame 13 and a second surface of the back plate 11. In an example shown in FIG. 2, there are totally four dismounting members 20 which are divided into two pairs, wherein one pair is located at one side edge of the back plate 11, and the other is located at the opposite side edge of the back plate 11. As shown in FIG. 3 and FIG. 4, each dismounting member 20 comprises a first connector 21 connected with the bearing frame 13 and a second connector 22 connected with the back plate 11. The first connector 21 and the second connector 22 form a hinge joint, and thus each dismounting member 20 is in the shape of a hinge as a whole. In an example, both the first connector 21 and the second connector 22 are connected with the bearing frame 13 or the back plate 11 through screws so as to facilitate the disassembly. The advantages of the dismounting members 20 being in the shape of a hinge will be described in detail below.

Figure 5:
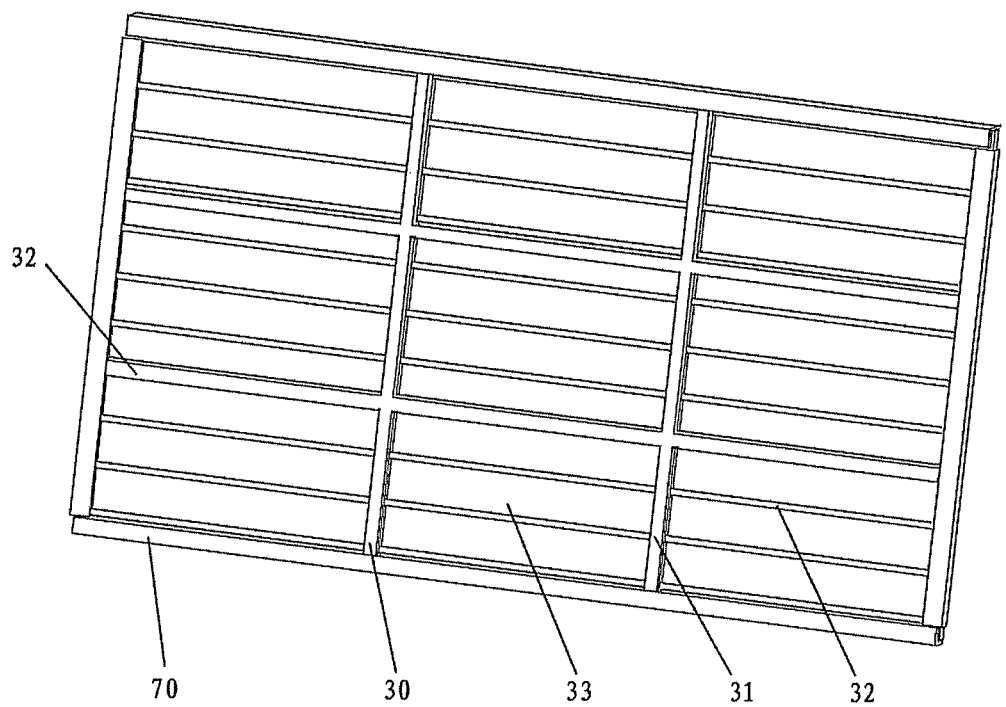
FIG. 5 is a schematic diagram of a backlight module with a diaphragm supporting member.

As shown in FIG. 5, the backlight module 10 further comprises a glue frame 70 fixedly arranged around the edges of the bearing frame. A diaphragm supporting member 30 is mounted on the first surface of the back plate 11, and is fixedly connected with the glue frame 70. The diaphragm supporting member 30 is formed by horizontal supporting bars 31 and vertical supporting bars 32, so that after the diaphragm supporting member 30 is mounted on the first surface of the back plate 11, it partitions the first surface of the back plate 11 into multiple cell gaps 33. These cell gaps 33 are used to assemble respective liquid crystal modules, which will be further described in detail below. It should also be noted that grooves (not shown) are formed on the contact portion between the diaphragm supporting member 30 and the back plate 11. The light source lamps 12 in the form of tubes can pass through these grooves, thus facilitating the assembly of the diaphragm supporting member 30.

Figure 6:
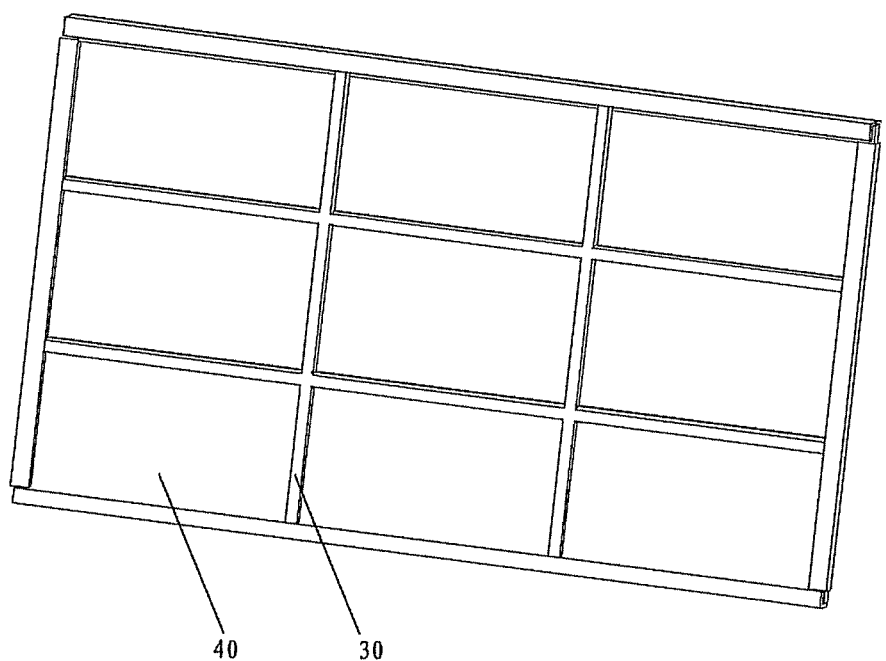
FIG. 6 schematically shows structure of a backlight module with optical diaphragms.

As shown in FIG. 6, the backlight module 10 further comprises an optical diaphragm 40 arranged in each of the cell gaps 33. In an example, the optical diaphragm 40 comprises a diffuser, a prism, an optical compensation film and the like. These components are known to those skilled in the art, and thus are not described in detail herein. On the whole, the back plate 11 of the backlight module 10 is connected with the bearing frame 13 through the dismounting members 20; the bearing frame 13 is fixedly connected with the glue frame 70; the diaphragm supporting member 30 is fixedly connected with the glue frame 70; and the optical diaphragm 40 is mounted on the diaphragm supporting member 30.

Figure 9:
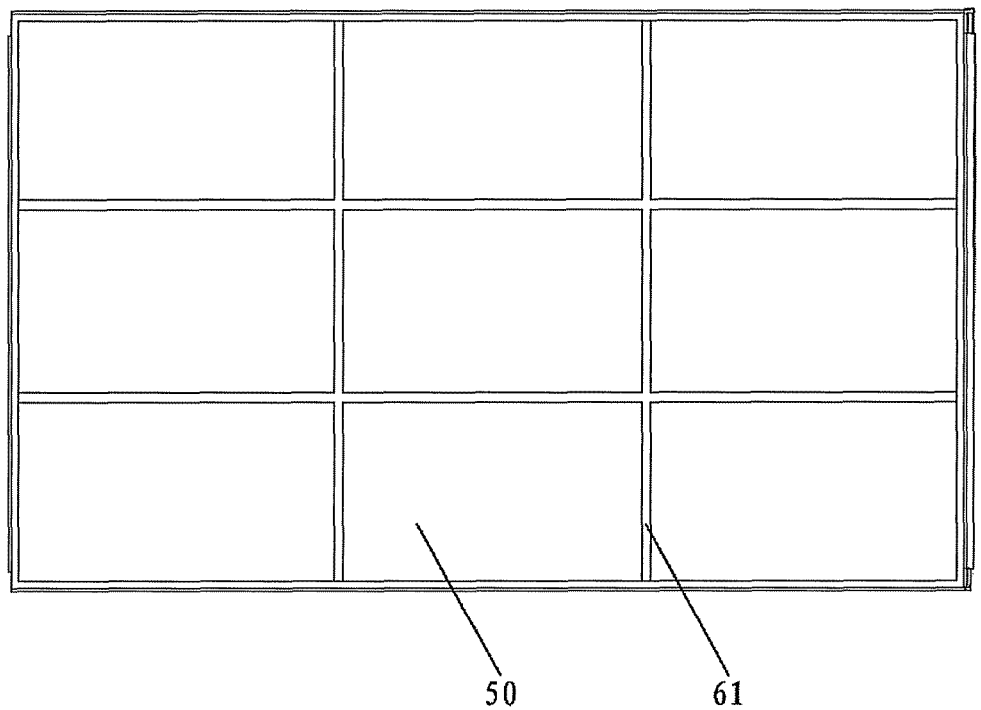
FIG. 9 is a schematic diagram of a splicing liquid crystal panel according to the present disclosure.

Finally, on the diaphragm supporting member 30, a plurality of liquid crystal modules 50 is mounted outside the optical diaphragm 40. It should be noted that each of the plurality of liquid crystal modules 50 is aligned with each of the corresponding cell gaps 33 on the first surface. In this case, a splicing liquid crystal panel 60 comprising the backlight module 10 and the liquid crystal modules 50 is formed, as shown in FIG. 9. Thus, the plurality of liquid crystal modules shares one backlight module 10, such that the production cost is reduced. In an example, in order to fixedly connect the liquid crystal modules 50 with the backlight module 10, a front frame 61 can be used.

In the splicing liquid crystal panel 60, the liquid crystal modules 50 are not directly connected with the back plate 11, but rather arranged on the diaphragm supporting member 30 and thus spaced from the back plate 11 in a certain distance, which means that the liquid crystal modules 50 are independent from the backlight module 10. When the back plate 11 fails, only one pair of the dismounting members needs to be dismantled. Because the dismounting members 20 are in the form of a hinge, the back plate 11 can be opened like a door for detection, without dismantling the liquid crystal modules 50. When the back plate 11 needs to be maintained or replaced, the back plate 11 can be removed merely through dismantling all the dismounting members 20, with no need to dismantle the liquid crystal modules 50. Thus, the maintenance of the splicing liquid crystal panel 60 becomes much more convenient.

The assembly process of the splicing liquid crystal panel 60 is described below according to FIG. 1 to FIG. 9.

Firstly, a plurality of light source lamps 12 are arranged on the first surface of the back plate 11, as shown in FIG. 1. Next, the bearing frame 13 is arranged around the back plate 11. Then, the dismounting members 20 are mounted, wherein the first connectors 21 of the dismounting members 20 are connected with the bearing frame 13 and the second connectors 22 thereof are connected with the second surface of the back plate 11, as shown in FIG. 2. The diaphragm supporting member 30 is fixedly arranged outside of the light source lamps 12 on the first surface of the back plate 11, and partitions the first surface of the back plate 11 into multiple cell gaps 33, as shown in FIG. 5. The optical diaphragm 40 is fixedly arranged on the diaphragm supporting member 30 to form a backlight module 10, as shown in FIG. 6. Finally, a plurality of liquid crystal modules 50 is mounted on the diaphragm supporting member 30, outside of the optical diaphragm 40 to form the splicing liquid crystal panel 60, as shown in FIG. 9.

Figure 7:
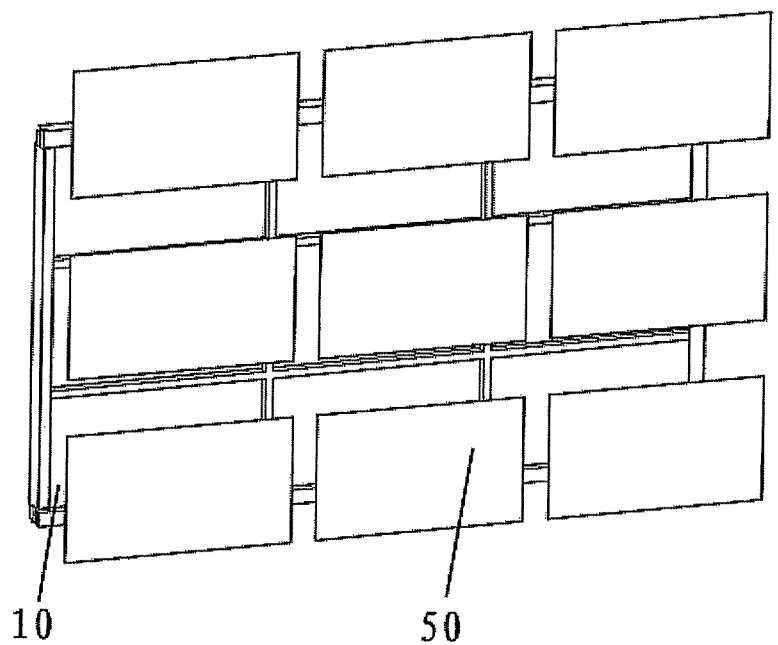
FIG. 7 is a schematic diagram showing the process of assembling liquid crystal modules on the diaphragm supporting member.
Figure 8:
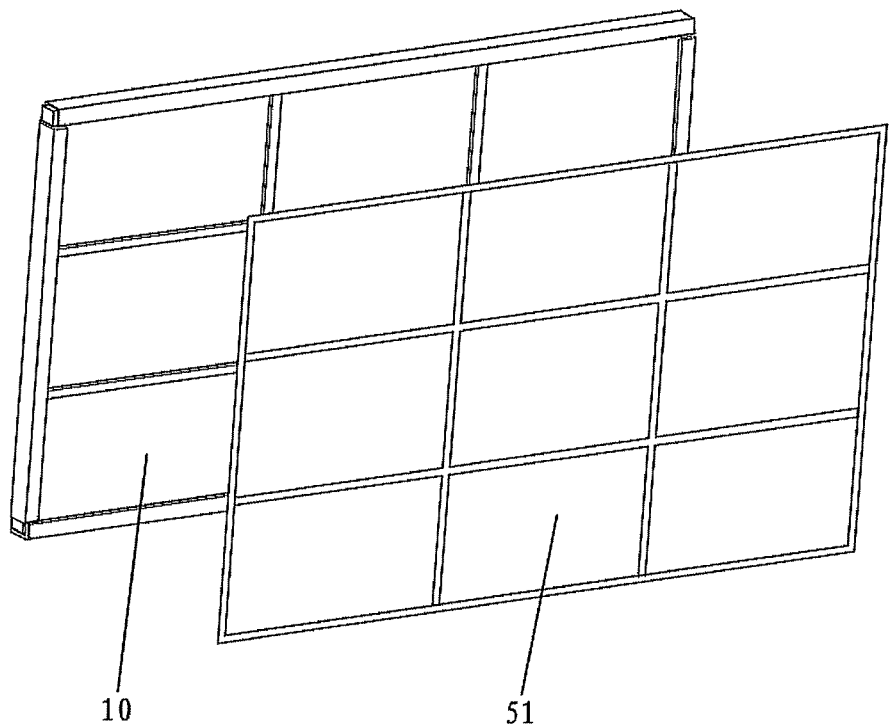
FIG. 8 is another schematic diagram showing the process of assembling liquid crystal modules on the diaphragm supporting member.

In an example, each of the liquid crystal modules 50 is arranged in a corresponding cell gap 33, as shown in FIG. 7. In another example, the multiple liquid crystal modules can be spliced together so as to form a unitary structure 51 first, and then mounted on the backlight module 10. To fixedly connect the liquid crystal modules 50 with the backlight module 10, the front frame 61 can be used.

Although not shown in drawings, the splicing liquid crystal panel 60 according to the present disclosure can be also applied to a splicing television. This splicing television similarly has the advantages of low cost and ease of maintenance.

Although the present disclosure has been described with reference to preferred embodiments, various modifications could be made to the present disclosure without departing from the scope of the present disclosure and components in the present disclosure could be substituted with equivalents. Particularly, as long as structural conflicts do not exist, all the technical features mentioned in all the embodiments may be combined together in any manner. The present disclosure is not limited to the specific embodiments disclosed in the description, but rather includes all technical solutions falling into the scope of the claims.

The invention claimed is:

1. A splicing liquid crystal panel, comprising a backlight module and a plurality of liquid crystal modules cooperating with the backlight module, said backlight module comprising a back plate, light source lamps arranged on a first surface of the back plate, a bearing frame surrounding the edges of the back plate, and dismounting members connected between the bearing frame and a second surface of the back plate, wherein each dismounting member comprises a first connector connected with the bearing frame and a second connector connected with the back plate, and the first connector and the second connector form a hinge joint.

2. The splicing liquid crystal panel according to claim 1, wherein a glue frame is fixedly arranged around the edges of the bearing frame.

3. The splicing liquid crystal panel according to claim 2, wherein it further comprises a diaphragm supporting member connected with the glue frame, and said diaphragm supporting member is arranged outside of the light source lamps and partitions the first surface into multiple cell gaps.

4. The splicing liquid crystal panel according to claim 3, wherein an optical diaphragm is mounted in each of the cell gaps.

5. The splicing liquid crystal panel according to claim 4, wherein on the diaphragm supporting member multiple liquid crystal modules are mounted outside of the optical diaphragms, and each of the multiple liquid crystal modules is aligned with a corresponding cell gap on the first surface.

6. The splicing liquid crystal panel according to claim 1, wherein the light source lamps are a plurality of tubes arranged in parallel with each other.

7. A method of assembling the splicing liquid crystal panel according to claim 5, comprising the following steps:

(a) arranging a plurality of light source lamps on the first surface of the back plate;

(b) arranging a bearing frame around the back plate;

(c) providing dismounting members, wherein a first connector of each dismounting member is connected with the bearing frame and a second connector of each dismounting member is connected with the second surface of the back plate;

(d) fixedly arranging a diaphragm supporting member outside of the light source lamps on the first surface of the back plate to partition the first surface into multiple cell gaps, and mounting optical diaphragms on the diaphragm supporting member to form a backlight module; and (e) mounting a plurality of liquid crystal modules outside of the optical diaphragms on the diaphragm supporting member to form the splicing liquid crystal panel.

8. The method according to claim 7, wherein in step (e), each of the plurality of liquid crystal modules is mounted in a corresponding cell gap formed in step (d).

9. The method according to claim 7, wherein in step (e), the plurality of liquid crystal modules are spliced together to form a unitary structure first, and then fit together with the backlight module.

10. A splicing television comprising the splicing liquid crystal panel according to claim 1.

* * * * *